B. Kuhns.
Grain Drill.

No. 87,052. Patented Feb. 16, 1869.

Witnesses,
C. F. Clausen
A. Ruppert

Inventor,
B. Kuhns
D. P. Holloway & Co
Atty

BENJAMIN KUHNS, OF DAYTON, OHIO.

Letters Patent No. 87,052, dated February 16, 1869.

IMPROVEMENT IN GRAIN-DRILLS.

The Schedule referred to in these Letters Patent and making part of the same.

*To all whom it may concern:*

Be it known that I, BENJAMIN KUHNS, of Dayton, in the county of Montgomery, and State of Ohio, have invented a new and useful Improvement in Agitators for Wheat-Drills; and I do hereby declare that the following is a full, clear, and exact description of the same, reference being had to the annexed drawings, making part of this specification, in which—

Corresponding letters in all the figures refer to corresponding parts.

Figure 1:
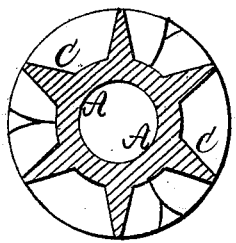
Figure 1 is a sectional elevation of my improved agitator, on line *x x* of fig. 3.
Figure 2:
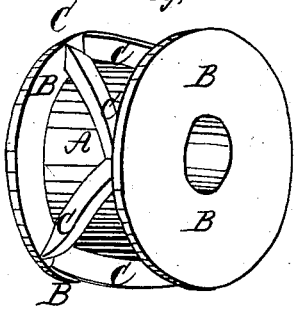
Figure 2 is a perspective view, showing the curved projections for agitating the grain in the seed-box.
Figure 3:
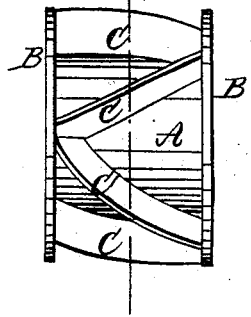
Figure 3 is a side elevation of the same.

This invention relates to an improvement in agitators for grain-drills; and

It consists in the construction of such device, as a consequence of which the grain will be taken alternately from opposite ends thereof, and carried across the mouth of the discharge-aperture, thus insuring a constant flow, and even or equal distribution of the seed through such aperture.

A, in the drawings, represents the agitator, which is composed of the hub A, upon each end of which there is a flange, B, which extends therefrom a distance sufficient to cause their peripheries to be flush with the outer surfaces of the curved or zigzag projections C C, which are secured to the hub A, and, at their ends, to the flanges B.

The flanges C C are so formed and arranged upon the hub of the device, as that their outer divergent ends are a considerable distance apart, while, owing to their angularity, their opposite ends approach and touch each other, thus forming a series of chambers, with their greatest arrears at the ends of the agitator, but alternating between such ends, so that as the device is rotated, the grain passes into these chambers, first at one end, then at the other, and so on alternately throughout the entire revolution of the agitator.

It will be observed that, as a consequence of the construction of these projections or flanges C C, the grain, which has passed from the seed-box to the distributing-chamber beneath it, will be carried to and across the mouth of the aperture in even quantities, and in a steady stream, and that any liability to clogging of the grain, and consequent stoppage of the flow, will be removed.

Having thus described my invention,

What I claim, and desire to secure by Letters Patent, is—

The within-described agitator for grain-drills, consisting of the hub A, projections C C, and flanges B B, constructed and arranged substantially as set forth.

In testimony whereof, I have signed my name to this specification, in the presence of two subscribing witnesses.

BENJAMIN KUHNS.

Witnesses:
 JACOB F. LENTZ,
 GEO. W. YOUNG.